United States Patent
Ito et al.

(10) Patent No.: US 7,448,549 B2
(45) Date of Patent: Nov. 11, 2008

(54) OPTICAL INFORMATION READER AND METHOD OF READING OPTICAL INFORMATION

(75) Inventors: Kunihiko Ito, Chiryu (JP); Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 817 days.

(21) Appl. No.: 10/921,092

(22) Filed: Aug. 19, 2004

(65) Prior Publication Data

US 2005/0040237 A1 Feb. 24, 2005

(30) Foreign Application Priority Data

Aug. 20, 2003 (JP) .............................. 2003-296331

(51) Int. Cl.
*G06K 7/10* (2006.01)
(52) U.S. Cl. .................. 235/454; 235/439; 235/459; 235/462.32; 235/472.01
(58) Field of Classification Search ................ 235/454, 235/462.32, 462.36, 462.4, 472.01, 459
See application file for complete search history.

(56) References Cited

U.S. PATENT DOCUMENTS 6,066,857 A 5/2000 Fantone et al.

6,431,452 B2 * 8/2002 Feng ..................... 235/472.01

FOREIGN PATENT DOCUMENTS

| EP | 0 406 907 A2 | 1/1991 |
| JP | A-H03-98181 | 4/1991 |
| JP | A-H04-126446 | 4/1992 |
| JP | 10-247215 | 9/1998 |
| JP | A-2003-507778 | 3/2000 |

OTHER PUBLICATIONS

First Office Action issued from Chinese Patent Office issued on Dec. 12, 2005 for the corresponding Chinese patent application No. 2004100576421 (a copy and English translation thereof).
Office Communication issued from Japan Patent Office dated Sep. 25, 2007 for related Japanese Patent application No. 2003-296331 (English translation enclosed.).

* cited by examiner

*Primary Examiner*—Seung H Lee
(74) *Attorney, Agent, or Firm*—Posz Law Group, PLC (57) ABSTRACT

In an optical information reader for optically reading a target based on a light reflected from the target, a translucent optical member is located on an optical axis of an imaging lens and is rotatable around a rotation axis. The rotation axis is substantially orthogonal to the optical axis. The translucent optical member is fixable at least first and second predetermined positions. When the translucent optical member is fixed at the first predetermined position, the translucent optical member has a first thickness through which the optical axis is penetrated, and when the translucent optical member is temporally fixed at the second predetermined position, the translucent optical member has a second thickness through which the optical axis is penetrated. The first thickness and second thickness are different from each other.

10 Claims, 6 Drawing Sheets

OPTICAL INFORMATION READER AND METHOD OF READING OPTICAL INFORMATION

CROSS REFERENCE TO RELATED APPLICATION

This application is based upon and claims the benefit of priority of the prior Japanese Patent Application 2003-296331 filed on Aug. 20, 2003 so that the descriptions of which are incorporated herein by reference.

BACKGROUND OF THE INVENTION

1. Field of the Invention

The present invention relates to an optical information reader having a function for adjusting a focal length of an imaging lens and a method of reading optical information.

2. Description of the Related Art

A conventional handheld optical information reader for reading optical information, such as a barcode, a two-dimensional code, or other similar codes, is installed in a handheld body case. In particular, the optical information reader has a photodetector, an imaging unit with an imaging lens, and a reading unit composed of a lighting device, which are installed in the body case, respectively.

A light is supplied from the lighting device through a reading window formed at one end portion, that is, a head portion, of the body case. The light is irradiated to a reading target, such as a barcode. A light reflected from the reading target according to the irradiated light is entered through the reading window into the imaging unit. The light entered into the imaging unit is focused on the photodetector by the imaging lens to be imaged thereon, so that an image corresponding to the reading target is picked up by the photodetector.

In this case, a reading distance defined as a distance between the reading window and the reading target is previously determined depending on an optical characteristic, such as a focal length of the imaging lens. A user, therefore, handles the body case of the optical information reader to locate it so that the reading window of the body case is positioned at the reading distance from the reading target or adjacent to the reading distance and the reading window is opposite to the reading target. After the positioning of the reading window of the body case of the optical information reader, the reading operations of the reading target set forth above are started.

In addition to the structure, an optical information reader having a mechanism capable of adjusting the focal length of the imaging lens has been created. The mechanism expands the range of usable reading distances of the optical information reader, thereby improving convenience of the users.

One example of the optical information reader with the focal length adjusting mechanism is disclosed in U.S. Pat. Publication No. 6,066,857 corresponding to Japanese Unexamined Patent Publication No. 2003-507778.

In the disclosed optical information reader, a focusing disk is rotatably disposed between an objective lens and a two-dimensional photodetector, such as CCD (Charge Coupled Device), so that an axis of the rotation of the focusing disk is offset with respect to an optical axis of the objective lens.

The focusing disk is provided at its circumferential edge with a plurality of more or less raised optical shims that have different thicknesses suitable to focus light from the objective lens on the CCD. Rotation of the focusing disk allows the focal length of the objective lens to be adjusted.

Another one example of the optical information reader with the focal length adjusting mechanism is disclosed in Japanese Unexamined Patent Publication No. H10-247215.

In the disclosed optical information reader, an optical path length variable member is disposed between an imaging lens and a CCD. The optical path length variable member has a pair of transparent glass plates that are arranged to be opposite to each other along a lens' optical axis at a predetermined interval. The optical path length variable member also has a cylindrical bellows disposed between the paired transparent glass plates to be expandable in the optical axis, and an optical refraction fluid filled in the bellows.

The optical path length variable member has a driving mechanism composed of an annular magnet mounted on one of the paired transparent glass plates to surround the bellows. The optical path length variable member also has a pair of coils disposed to the other of the paired transparent plates to surround the bellows and the annular magnet.

When a driving current is supplied to flow in the coils, the driving current generates magnetic force so that the magnetic force causes the paired transparent glass plates to relatively move in parallel to the optical axis. The relative movements of the paired transparent glass plates permit the length of the optical refraction fluid in the optical axis to vary, thereby adjusting the optical path length between the imaging lens and the CCD.

The former optical information reader disclosed in U.S. Pat. Publication No. 6,066,857, however, requires the plurality of optical parts, such as the optical shims having different thicknesses corresponding to the focal lengths, respectively, which may cause the number of optical parts and the whole size of the optical information reader to increase.

Especially, when using a one-dimensional photodetector as the photodetector, whose light-receptive area is long in one-dimensional direction, each of the optical parts (optical shims) is large in size, which may cause the whole size of the optical information reader to more increase.

On the other hand, in the later optical information reader disclosed in Japanese Unexamined Patent Publication No. H10-247215, the optical path length variable member requires keeping the driving current flowing in the coils to maintain the positions of the paired glass plates, causing electric power consumption of the optical information reader to increase. This results in that the optical path length variable member may be unsuitable for battery-drive handheld optical information readers.

SUMMARY OF THE INVENTION

The present invention is made on the background.

Accordingly, it is an object of the present invention to provide a method and an optical information reader having a member for adjusting a focal length of an imaging unit, which are capable of simplifying the structure of the focal length adjusting member.

According to one aspect of the present invention, there is provided an optical information reader for optically reading a target based on a light reflected from the target. The optical information reader comprises an imaging lens with an optical axis and a focal length, the reflected light entering into the imaging lens; and a photodetector having an active area and located on the optical axis, the imaging lens focusing the reflected light on the active area of the photodetector based on the focal length. The optical information reader also has a translucent optical member located on the optical axis and rotatable around a rotation axis substantially orthogonal to the optical axis, said translucent optical member being fixable at least first and second predetermined positions. When the translucent optical member is fixed at the first predetermined position, the translucent optical member has a first thickness through which the optical axis is penetrated, and when the translucent optical member is temporally fixed at the second predetermined position, the translucent optical member has a second thickness through which the optical axis is penetrated. The first thickness and second thickness are different from each other.

In a method of optically reading a target based on a light reflected from the target, an imaging lens with an optical axis and a focal length is provided, and a photodetector having an active area to be located on the optical axis is also provided. A translucent optical member having first and second different thicknesses is provided to be located on the optical axis. The translucent optical member around a rotation axis substantially orthogonal to the optical axis is provided. The translucent optical member is fixed to one of first and second predetermined positions so that the optical axis is penetrated through the one of the first and second different thicknesses, thereby adjusting the focal length. When the reflected light enters into the imaging lens, focusing the reflected light on the active area of the photodetector through the imaging lens based on the adjusted focal length.

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT OF THE INVENTION

An embodiment of the invention will be described hereinafter with reference to the accompanying drawings. In an embodiment, the invention is applied to a handheld two-dimensional code reader.

Figure 1:
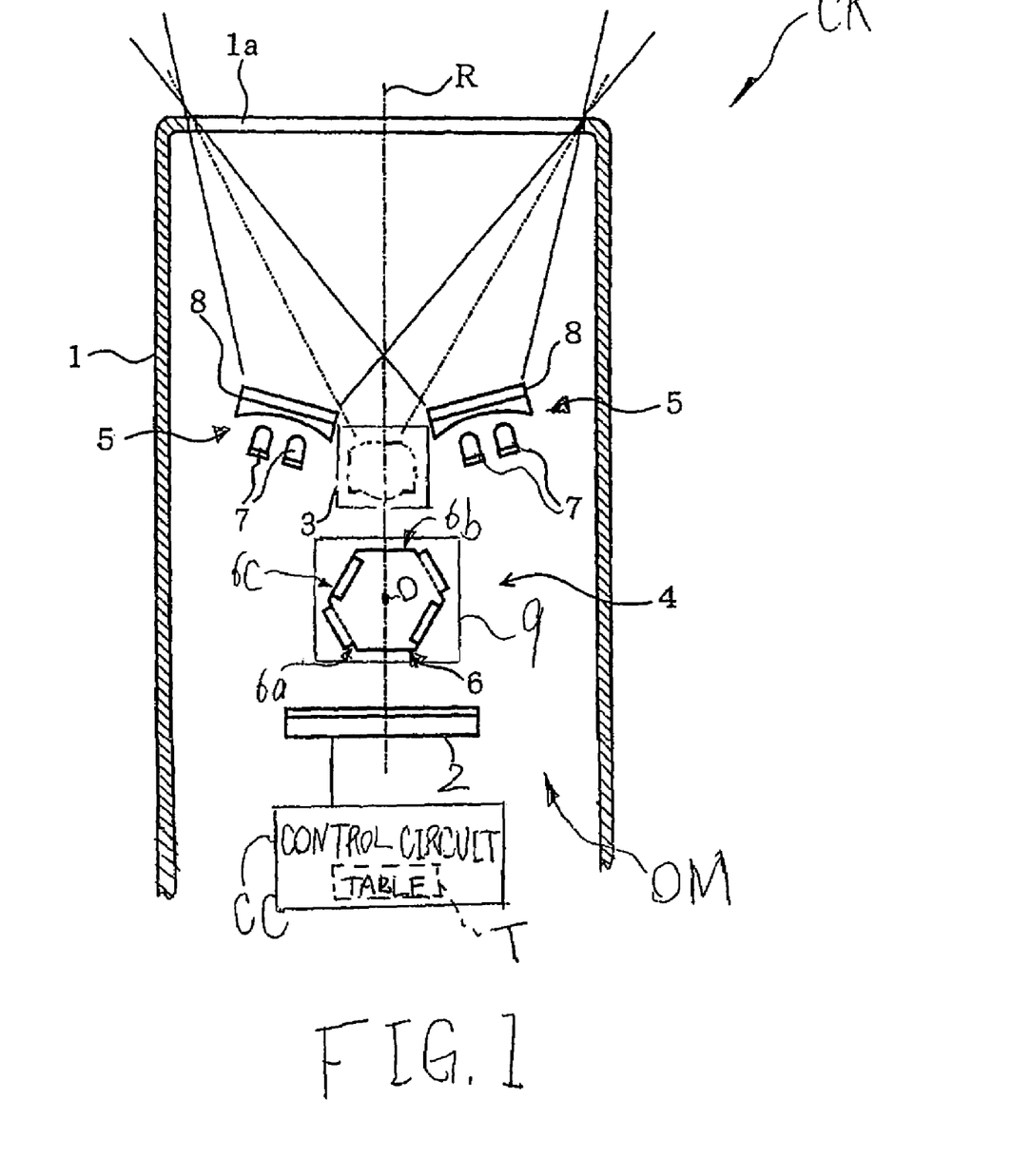
FIG. 1 is a partially cross sectional view schematically illustrating a structure of an optical information reader according to an embodiment of the present invention.

As shown in FIG. 1, the two-dimensional code reader CR as an optical information reader according to the present invention is provided with a handheld body case 1 having a rectangular parallelepiped shape and a size that allows a user to handle in one hand.

Figure 5A:
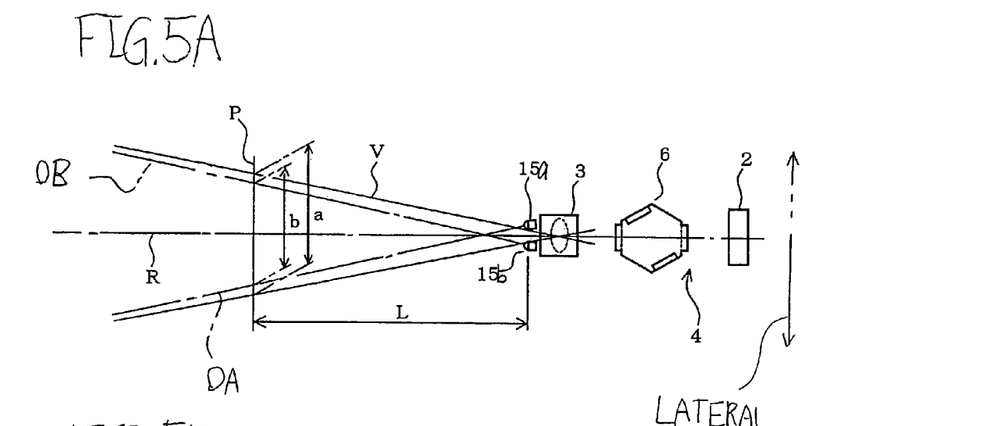
FIG. 5A is a view schematically illustrating a unit configured to measure a distance between its unit and a label as a reading target, which is viewed along the rotating direction of the optical member according to the embodiment.

The two-dimensional code reader CR is provided with an optical mechanism OM disposed in one lateral end side of the body case 1. The optical mechanism OM is operative to read a two-dimensional code C, such as a QR code, which is written on a reading target, such as a label P (see FIG. 5), which is a piece of paper or another media by printing or other similar methods. The label can be attached on goods, which is the same as general barcodes. The two-dimensional code includes information, such as, a manufactures serial number, a name, a unique identification number and a date of manufacture of the goods.

The body case 1 is formed at the one lateral end wall with a reading window 1a having a rectangular shape and translucency. The two-dimensional code reader CR is provided with a control circuit CC electrically coupled to the optical mechanism OR, a communication circuit (not shown) electrically coupled to the control circuit CC, a secondary battery (not shown) served as a drive power supply for the optical mechanism OR, the control circuit CC, and the communication circuit.

The control circuit CC is operative to control the whole of the two-dimensional code reader CR and to perform decoding processes. The communication circuit is operative to communicate with an external circuit of the two-dimensional code reader CR. The two-dimensional code reader CR is provided at its one longitudinal side surface with a display and a key operation unit, which are electrically coupled to the control circuit CC. The display is operative to display information sent from the control circuit CC and the key operation unit allows a user of the two-dimensional code reader CR to enter information to the control circuit CC.

The two-dimensional code reader CR is also provided with a trigger switch (not shown) disposed at another one longitudinal side surface. The trigger switch allows the user to instruct a measurement operation and a reading operation to the control circuit CC. The trigger switch, for example, allows the user to push it in two strokes.

That is, when the user pushes the trigger switch in the first stroke, such as in half stroke, the instruction to perform the measurement operation is sent to the control circuit CC so that the control circuit CC performs the measurement operations described hereinafter. When the user pushes the trigger switch in the second stroke, such as in full stroke, the instruction to perform the reading operation is sent to the control circuit CC so that the control circuit CC and the optical mechanism OM perform reading operations described hereinafter.

The optical mechanism OM includes a photodetector 2, an imaging unit 4 with an imaging lens 3, and a pair of lighting devices 5. As shown in FIGS. 1, 2A-2C, and 5, the photodetector 2 is composed of a CCD area sensor that is located at the center portion in the body case 1 so that an active area of the photodetector 2 is opposite to the reading window 1a. The imaging lens 3 of the imaging unit 4 is disposed between the reading window 1a and the photodetector 2 so that an optical axis of the imaging lens 3 is aligned with the center of the active area of the photodetector 2. The optical axis, such as a reading axis R, of the imaging lens 3 is aligned with the center of the reading window 1a. The reading axis R extends orthogonally with the one lateral end surface, which is formed with the reading window 1a, of the body case 1.

The imaging unit 4 also includes a translucent optical member 6 for adjusting a total focal length of the imaging unit 4. The optical member 6 is interposed between the photodetector 2 and the imaging lens 3. The imaging lens 3 is composed of a body tube and a plurality of lens arranged to be aligned with each other in the body tube.

The imaging unit 4 further includes a drive unit 9, which is schematically illustrated in FIG. 1, mechanically connected to the optical member 6 for rotatably driving it.

Each of the lighting devices 5 is disposed around the imaging lens 3. That is, each of the lighting devices 5 is provided with light emitting devices 7 each of which is served as a light source, and a light lens 8 disposed between each light emitting device 7 and the reading window 1a. An optical axis of each light lens 8 is directed to the reading window 1a so that each light lens 8 is operative to collect and diffuse a light emitted from each light emitting device 7 through the reading window 1a.

When the reading window 1a of the body case 1 is positioned so that the reading window 1a is opposite to the reading target, such as the label P, on which the two-dimensional code C is written, the light emitted from each of the lighting devices 5 is irradiated through the reading window 1a to the two-dimensional code C. Lights reflected from the two-dimensional code C are entered through the reading window 1a into the imaging unit 4. The lights entered into the imaging unit 4 are focused on the active area of the photodetector 2 by the imaging lens 3, so that an image corresponding to the reading target is picked up by the photodetector 2. The image picked up by the photodetector 2 is sent to the control circuit CC so that the two-dimensional code C of the label P is decoded by the control circuit CC according to the image.

Next, the structure of the optical member 6 will be explained in detail hereinafter in accordance with FIGS. 1, 2A-2C, and 3-5.

The optical member 6 has a substantially hexagonal cylinder formed by transparent material with high refractive index, which is higher than the refractive index of air, such as transparent plastic, glass, or other similar material.

The optical member 6 has a pair of hexagonal surfaces and six side surfaces parallel to each other. The six side surfaces connect between the paired hexagonal surfaces, respectively.

In this embodiment, as shown in FIGS. 1, 2A-2C and 3, the optical member 6 has a substantially regular hexagonal cylinder so that a cross-sectional surface of the optical member 6 in orthogonal to the side surfaces has six adjacent angles. All of the six angles are equal to each other so that the angles all are 120 (degrees). The diagonal lines of the cross-sectional surface of the optical member 6 cross to each other in a center point.

The optical member 6 has plurality pairs, such as three pairs of opposite side surfaces, the first pair of which is first side surfaces 6a, 6a, the second pair of which is second side surfaces 6b, 6b, and the third pair of which is third side surfaces 6c, 6c. The first side surfaces 6a, 6a are parallel to each other, the second side surfaces 6b, 6b are parallel to each other, and the third side surfaces 6c, 6c are parallel to each other.

Figure 3:
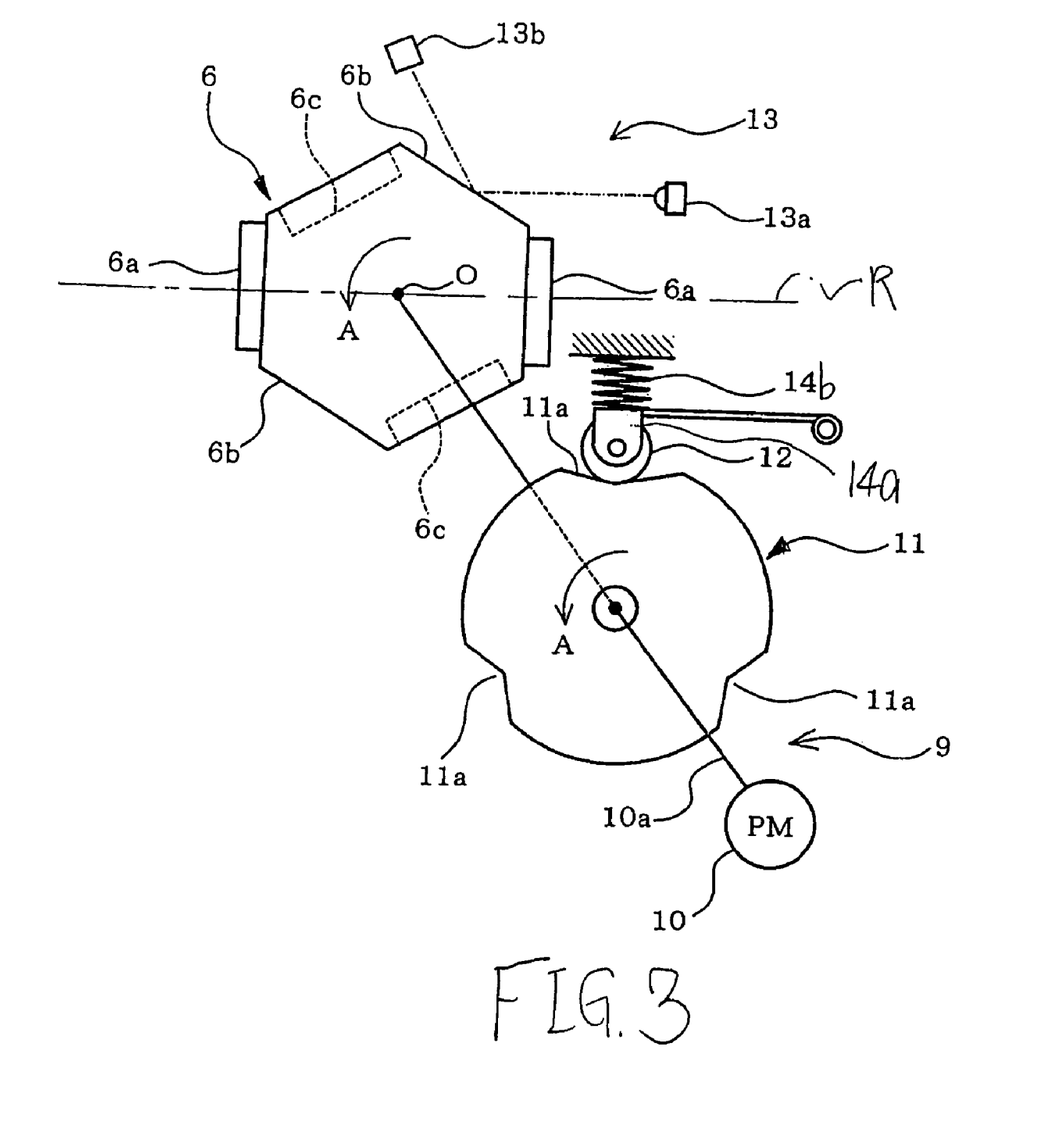
FIG. 3 is a view schematically illustrating a structure of a driving unit shown in FIG. 1 according to the embodiment.

As shown in FIGS. 1 and 3, the optical member 6 has a center axis O passing through the center point and parallel to the side surfaces 6a, 6a, 6b, 6b, 6c, 6c. The optical member 6 is rotatably supported by the drive unit 9 between the photodetector 2 and the imaging lens 3 around its center axis O so that the reading axis R penetrates through the optical member 6 to be orthogonal to the center axis O.

The drive unit 9 is configured to drive the optical member 6 so that the optical member 6 is configured to rotate around its center axis O (referred to as rotation axis O hereinafter) that is orthogonal to the reading axis R. Incidentally, a direction orthogonal to the reading axis R and to the rotation axis O is defined as a lateral direction hereinafter.

The first side surfaces 6a, 6a at least partially protrude outwardly by certain quantity while their protruded surfaces 6a1, 6a1 are kept to be parallel to the rotation axis O.

The protruded surfaces 6a1, 6a1 are configured that, when the optical member 6 rotates around the rotation axis O and the first side surfaces 6a, 6a of the optical member 6 are opposite to the reading window 1a, the reading axis R penetrates through the protruded surfaces 6a1, 6a1, respectively.

The third side surfaces 6c, 6c are at least partially concave inwardly by certain quantity while their concaved surfaces 6c1, 6c1 are kept to be parallel to the rotation axis O.

The concaved surfaces 6c1, 6c1 are configured that, when the optical member 6 rotates around the rotation axis O and the third side surfaces 6c, 6c of the optical member 6 are opposite to the reading window 1a, the reading axis R penetrates through the concaved surfaces 6c1, 6c1, respectively.

One of the first side surfaces 6a, 6a is symmetrically positioned and formed through the rotation axis O to the other thereof, and one of the second side surfaces 6b, 6b is symmetrically positioned and formed through the rotation axis O to the other thereof. Furthermore, one of the third side surfaces 6c, 6c is symmetrically positioned and formed through the rotation axis O to the other thereof.

As shown in FIGS. 1 and 2A-2C, the optical member 6 is configured to be temporally fixed at predetermined first, second, and third rotation stop positions. In other words, the optical member 6 is configured to be temporally fixed each time the optical member 6 rotates at predetermined first, second, and third rotation stop angles.

Figure 2A:
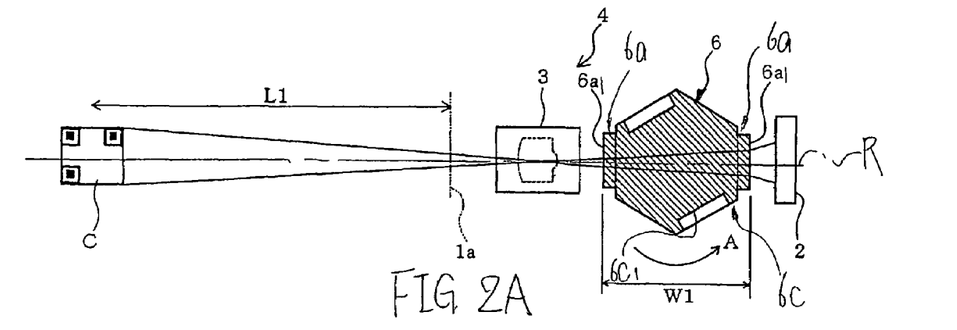
FIG. 2A is a view schematically illustrating an optical member located at a first rotation stop position and a thickness of the optical member through which a reading axis is penetrated, which is viewed along a rotating direction of the optical member according to the embodiment.
Figure 2B:
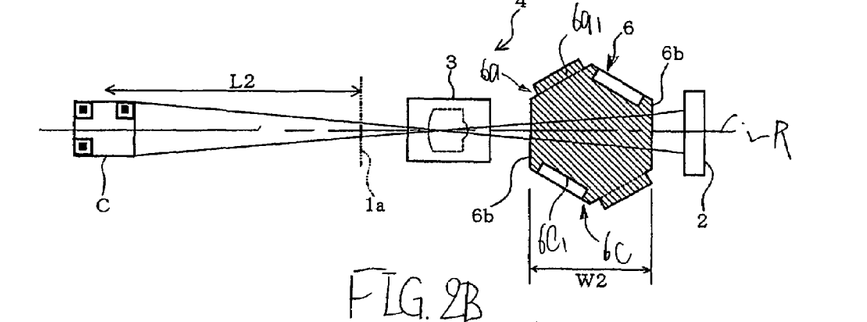
FIG. 2B is a view schematically illustrating the optical member located at a second rotation stop position and a thickness of the optical member through which the reading axis is penetrated, which is viewed along the rotating direction of the optical member according to the embodiment.
Figure 2C:
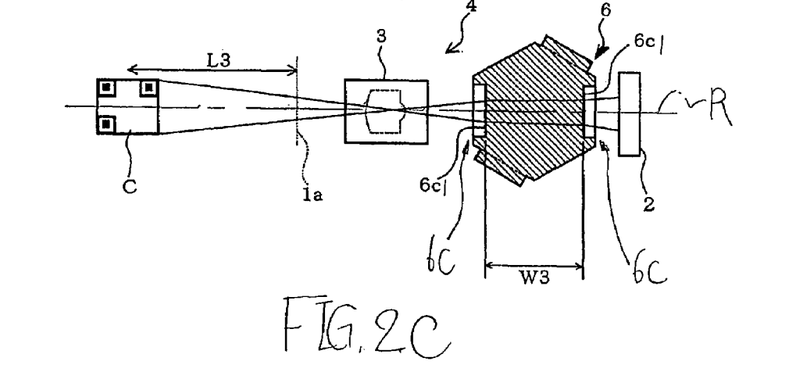
FIG. 2C is a view schematically illustrating the optical member located at a third rotation stop position and a thickness of the optical member through which the reading axis is penetrated, which is viewed along the rotating direction of the optical member according to the embodiment.

A thickness of the optical member 6 through which the rotational axis R is penetrated is changed depending on the first, second, and third rotation stop positions.

This change of the thickness of the optical member 6 allows an optical path length between the imaging lens 3 and the photodetector 2 to be adjusted. This adjustment of the optical path length permits the total focal length of the imaging unit 4 to be controlled, and furthermore, a reading distance of the two-dimensional code reader CR to be controlled. The reading distance of the two-dimensional code reader CR is defined as a distance between the reading window 1a and the reading target, such as the label P.

FIG. 2A shows a state that the optical member 6 is temporally fixed at the first rotation stop position. In this state, the protruded surfaces 6a1, 6a1 of the optical member 6 are arranged to be orthogonal to the reading axis R, respectively.

In particular, in this embodiment, when the optical member 6 is stopped at the first rotation stop position, a dimension of the thickness W1 through which the reading axis R is penetrated between their protruded surfaces 6a1, 6a1 is set to, for example, 16 millimeters (mm) or thereabout. In addition, when the optical member 6 is stopped at the first rotation stop position, the reading distance L1 is set to, for example, 300 mm plus or minus 50 mm.

FIG. 2B shows a state that, after the optical member 6 rotates from the first rotational position in an anticlockwise direction, which is shown by an arrow A, by an angle of 120°, the optical member 6 is temporally fixed at the second rotation stop position.

In this state, the second opposite side surfaces 6b, 6b of the optical member 6 are arranged to be orthogonal to the reading axis R. In particular, in this embodiment, when the optical member 6 is stopped at the second rotation stop position, a dimension of the thickness W2 through which the reading axis R is penetrated is set to, for example, 13 mm or thereabout. The reading distance L2 is set to, for example, 200 mm plus or minus 50 mm, which is shorter than the reading distance L1.

FIG. 2C shows a state that, after the optical member 6 further rotates from the second rotational position in the anticlockwise direction, which is shown by an arrow A, by an angle of 120, the optical member 6 is temporally fixed at the third rotation stop position.

In this state, the protruded surfaces 6a1, 6a1 of the optical member 6 are arranged to be orthogonal to the reading axis R, respectively.

In particular, in this embodiment, when the optical member 6 is stopped at the third rotation stop position, a dimension of the thickness W3 through which the reading axis R is penetrated between their concaved surface portions 6c1, 6c1 is set to, for example, 10 mm or thereabout. In addition, when the optical member 6 is stopped at the third rotational position, the reading distance L3 is set to, for example, 100 mm plus or minus 50 mm, which is shorter than the reading distance L2. Incidentally, the length of each of the side surfaces 6a, 6a, 6b, 6b, 6c, 6c of the optical member 6 is set to, for example, 10 mm or thereabout.

The drive unit 9, as shown in FIG. 3, is designed as a direct-drive system. That is, the drive unit 9 has a stepping motor 10 with a rotating shaft 10a, and a cam plate 11 directly fixedly mounted on the rotating shaft 10a. The optical member 6 is directly coaxially mounted on the rotating shaft 10a so that the rotating axis O of the optical member 6 is aligned with the rotating shaft 10a. The stepping motor 10 is electrically coupled to the control circuit CC.

The drive unit 9 also has a cam follower 12 sidably contacted to an outer peripheral surface of the cam plate 11. The drive unit 9 has a reflecting photoelectric sensor 13 for sensing positions of the optical member 6. The drive unit 9 has a supporting member 14a that supports the cam follower 12, and an elastic member 14b attached to the body case 1 and movably supporting the supporting member 14a and the cam follower roller 12 in a radial direction of the cam plate 11. The elastic member 14b is also adapted to bias the cam follower roller 12 to be abutted on the outer peripheral surface of the cam plate 11.

The cam plate 11 is shaped as a substantially circular plate, and the outer peripheral surface is formed with three concave portions 11a each having a substantially V and spaced 120° apart.

That is, while the rotating shaft 10a is rotated together with the cam plate 11 and the optical member 6, the elastic member 14b permits the cam follower 12 to keep sidably contacting to the outer peripheral surface of the cam plate 11. In this embodiment, the optical member 6 and the drive unit 9 are configured that, when the cam follower 12 is fitted in one of the concave portions 11a, the optical member 6 is stopped at one of the first to third rotation stop positions. For example, in FIG. 3, the optical member 6 is stopped at the first rotation stop position. That is, each time the cam follower 12 is fitted in one of the concave portions 11a, the optical member 6 is stopped at one of the first to third rotation stop positions.

The reflecting photoelectric sensor 13 is composed of a phototransmitter 13a and a photoreceiver 13b, which are electrically coupled to the control circuit CC, respectively.

The phototransmitter 13a is disposed at a predetermined position so that a light transmitted from the phototransmitter 13a is reflected from one of the side surfaces of the optical member 6 except for the side surfaces through which the reading axis R are penetrated. In a state shown in FIG. 3, the light transmitted from the phototransmitter 13a is reflected from one of the second side surfaces 6b, 6b.

The photoreceiver 13b is disposed at a predetermined position so that, when the optical member 6 is stopped at one of the first to third rotation stop positions, the photoreceiver 13b can receive the light reflected from one of the side surfaces of the optical member 6 except for the side surfaces through which the reading axis R is penetrated. While receiving the reflected light, the photoreceiver 13b sends detection pulses to the control circuit CC.

Figure 4:
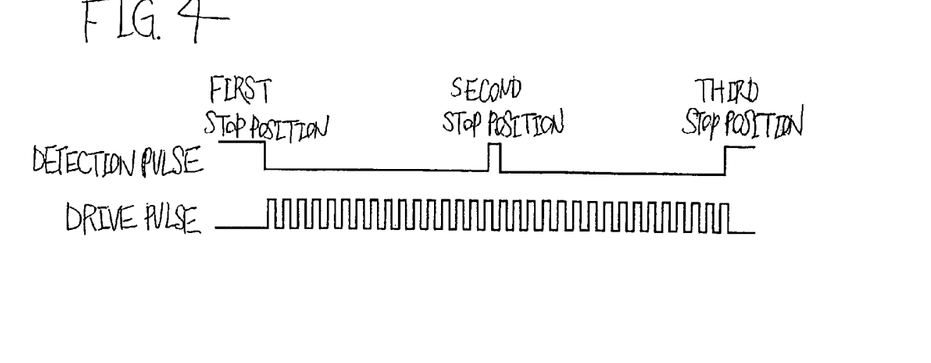
FIG. 4 is a timing chart of detection pulses and drive pulses required to control a stepping motor shown in FIG. 3 according to the embodiment.

The stepping motor 10 is controlled by the control circuit CC. That is, the control circuit CC, as shown in FIG. 4, sends drive pulses to the stepping motor 10 according to the detection pulses sent from the photoreceiver 13b. The drive pulses allow the stepping motor 10 to rotate the rotation shaft 10a in a predetermined stepping angle, thereby selectively rotating the optical member 6 up to any one of the first to third rotation stop positions.

For example, as shown in FIG. 4, in a state that the optical member 6 is located at the first rotation stop position, when rotating the optical member 6 up to the third rotation stop position, the control circuit CC sends the drive pulses to the stepping motor 10. The stepping motor 10, according to the drive pulses, rotates the rotation shaft 10a together with the optical member 6 in the predetermined stepping angle.

In a case where the detection pulse is sent from the photodetector 13b when the optical member 6 is stopped at the second rotation stop position, the control circuit CC keeps sending the drive pulses to the stepping motor 10. In a case where the detection pulse is sent from the photodetector 13b when the optical member 6 is stopped at the third rotation stop position, the control circuit CC stops the send of the drive pulses to the stepping motor 10. As a result, the optical member 6 is stably located at the third rotation stop position.

Incidentally, the stepping positions of the stepping motor 10 are previously matched with the rotating positions of the cam plate 11 and thus the rotating positions (phases) of the optical member 6. The drive pulses may allow the rotation speed of the stepping motor 10 (the optical member 6) to accelerate or decelerate.

Figure 5B:
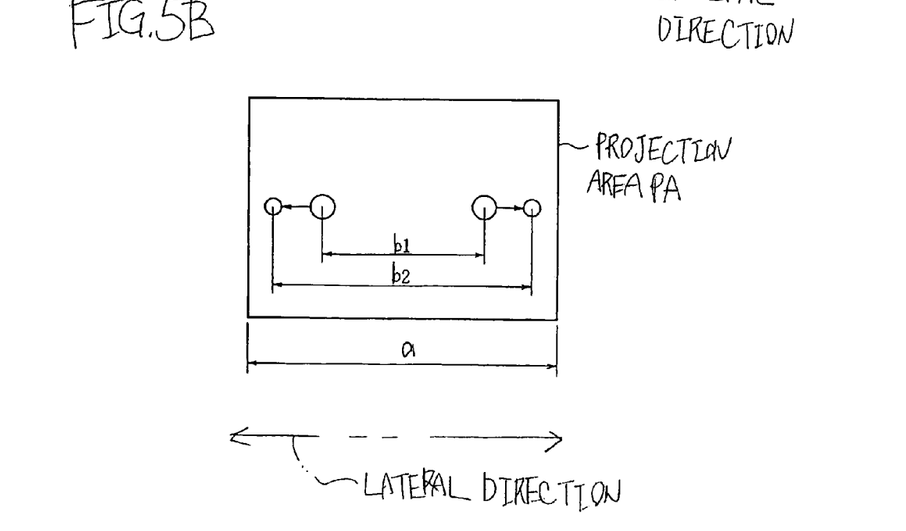
FIG. 5B is a view schematically illustrating a projection area of a reading field of view projected on the label according to the embodiment.

As shown in FIGS. 5A and 5B, the two-dimensional code reader CR is provided with a pair of pointer light emitting devices 15a, 15b, such as LDs (laser diodes), which are served as a unit for measuring a distance between each of the pointer light emitting devices 15a, 15b and the label P as the reading target. The pointer light emitting devices 15a and 15b are electrically coupled to the control circuit CC.

As shown in FIG. 5, the pointer light emitting devices 15a, 15b are disposed around the imaging lens 3 along the lateral direction so that the pointer light emitting devices 15a, 15b are symmetrical through the imaging lens 3 along the lateral direction.

It is assumed that the reading window 1a of the body case 1 is positioned so that the reading window 1a is opposite to the reading target, such as the label P. In this one of service conditions of the code reader RC, an optical axis OA of the pointer light emitting device 15a is directed to cross with the reading axis R. In this one of the service conditions of the code reader RC, an optical axis OB of the pointer light emitting devices 15b is directed to cross with the reading axis R and the optical axis OA of the pointer light emitting devices 15a.

Each of pointer lights, such as red spotlights, emitted along each of the optical axes OA and OB from each of the pointer light emitting devices 15a and 15b are limited within a reading field of view V defined by the imaging unit 4 and the photodetector 2. The reading field of view V represents the area readable by the imaging unit 4 and the photodetector 2.

The pointer lights emitted along the optical axes OA and OB from the pointer light emitting devices 15a and 15b are irradiated through the reading window 1a to both sides of the label P along the lateral direction, respectively.

The pointer lights emitted along the optical axes OA and OB from the pointer light emitting devices 15a and 15b are positioned within the profile of the reading field of view V. This results in that the variation of a distance L between each beam emitting point of each pointer light emitting device 15a, 15b and the reading target (label P) causes the irradiated positions of the pointer lights on a projection area PA of the reading field of the view V projected on the target (label P) to vary.

That is, as shown in FIG. 5B, when the reading target (label P) is positioned to be relatively close to the reading window 1a, the distance b between the irradiated positions of the pointer lights on the projection area PA is represented as "b1".

In contrast, when the reading target (label P) is positioned to be far from the reading window 1a, the distance b between the irradiated positions of the pointer lights on the projection area PA is represented as "b2", which is wider than the distance b1.

Therefore, the farther the reading target (label P) is from the reading window 1a, the closer the irradiated positions of the pointer lights on the projection area PA are to both sides of the projection area PA along the lateral direction. In other words, the farther the reading target (label P) is from the reading window 1a, the farther the distance between the irradiated positions of the pointer lights on the projection area PA are from each other.

This makes it clear that the distance b between the irradiated positions of the pointer lights on the projection area PA represents information related to the positional relationship between the label P and the reading window 1a.

Figure 6:
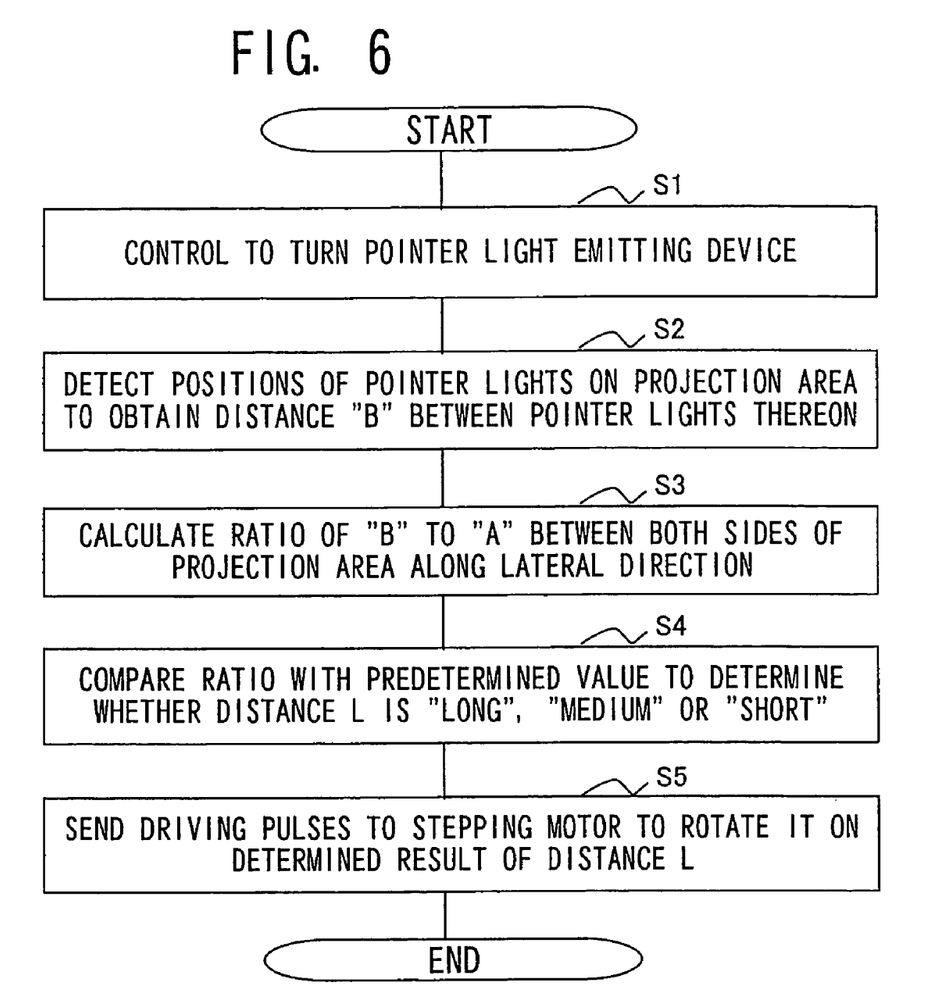
FIG. 6 is a flowchart schematically illustrating processes of a control circuit illustrated in FIG. 1 according to the embodiment.

The control circuit CC, when the user pushes the trigger switch in the first stroke so that the instruction to perform the measurement operation is sent to the control circuit CC, controls to turn on the pointer light emitting devices 15a and 15b, respectively (step S1 of FIG. 6).

Lights reflected from the reading target (label P) based on the pointer lights are entered through the reading window 1a into the imaging unit 4. The reflected lights entered into the imaging unit 4 are focused on the active area of the photodetector 2 by the imaging lens 3, so that an image based on the pointer lights is picked up by the photodetector 2. The image picked up by the photodetector 2 is sent to the control circuit CC.

The control circuit CC detects the positions of the pointer lights irradiated on the projection area PA projected on the reading target (label P), thereby obtaining the distance b between the irradiated positions of the pointer lights on the projection area PA (step S2).

The control circuit CC calculates a ratio (b/a) of the obtained distance b to a length "a" between both sides of the projection area PA along the lateral direction (step S3). Next, the control circuit CC compares the calculated ratio (b/a) with a predetermined value stored in a table T incorporated in the control circuit CC, thereby determining whether the distance L is "long", "medium", or "short" (step S4).

When the distance L is determined to "long", the distance L is represented as "long distance La" representing that the label P is relatively far from the reading window 1a. When the distance L is determined to "short", the distance L is represented as "short distance Lc" representing that the label P is relatively close to the reading window 1a.

When the distance L is determined to "medium", the distance L is represented as "medium distance Lb". The long distance La is the longest of the distances La to Lc, and the medium distance Lb is a medium between the long distance La and the short distance Lc.

The medium distance Lb represents that the distance between the label P and the reading window 1a is a medium between the distance between the label P and the reading window 1a in a case where the distance L is the long distance La and that between the label P and the reading window 1a in a case where the distance L is the short distance Lc.

Subsequently, the control circuit CC sends the driving pulses to the stepping motor 10 of the drive unit 9 to rotate it according to the determined result of the distance L, thereby rotating the optical member 6 up to any one of the first to third rotation stop positions (step S5).

That is, when the determined result represents that the distance L is "long distance La", the optical member 6 is rotated up to the first rotation stop position to be stopped thereat. When the determined result represents that the distance L is "medium distance Lb", the optical member 6 is rotated up to the second rotation stop position to be stopped thereat. When the determined result represents that the distance L is "short distance Lc", the optical member 6 is rotated up to the third rotation stop position to be stopped thereat.

Next, overall operations of the two-dimensional code reader CR will be described hereinafter.

In a case of using the two-dimensional code reader CR to read the two-dimensional code C written on the label P, the user locates the two-dimensional code reader CR at a position in front of the label P so that the reading window 1a of the body case 1 is opposite to the label P at an arbitrary distance therebetween.

Next, the user pushes the trigger switch in the first stroke. The first stroke of the trigger switch causes the measurement operation of the code reader CR to be performed.

That is, the control circuit CC executes the processes of steps S1 to S5 set forth above. This results in that the distance L between each pointer light emitting device 15a, 15b and the label P and therefore the positional relationship between the reading window 1a and the label P are determined, respectively, so that the optical member 6 is located at any one of the first to third rotation stop positions.

Next, the user pushes the trigger switch in the second stroke so that the reading operation of the two-dimensional code C is performed.

That is, the light emitted from each of the lighting devices 5 is irradiated through the reading window 1a to the two-dimensional code C written on the label P. Lights reflected from the two-dimensional code C are entered through the reading window 1a into the imaging lens 3 of the imaging unit 4.

The lights entered into the imaging lens 3 are focused through the optical member 6 on the active area of the photodetector 2 by the imaging lens 3, so that an image corresponding to the two-dimensional code C is picked up by the photodetector 2. The image picked up by the photodetector 2 is sent to the control circuit CC so that the two-dimensional code C of the label P is decoded by the control circuit CC according to the image.

In particular, in the embodiment of the present invention, as shown in FIGS. 2A to 2C, the rotations of the optical member 6 up to the first, the second, and the third rotation stop positions, respectively, allow the thickness of the optical member 6 through which the optical axis R is penetrated to be adjusted. The adjustment of the thickness of the optical member 6 through which the reading axis R is penetrated permits the optical path length between the imaging lens 3 and the photodetector 2 to be adjusted.

The adjustment of the optical path length between the imaging lens 3 and the photodetector 2 allows the total focal length of the imaging unit 4 to be controlled.

For example, when the distance L between each pointer light emitting device 15a, 15b and the label P is relatively "long", that is, the long distance La, the optical member 6 is rotated up to the first rotation stop position to be stopped thereat.

As shown in FIG. 2A, when the optical member 6 is located at the first rotation stop position, the protruded surfaces 6a1, 6a1 of the optical member 6 are arranged to be orthogonal to the reading axis R, respectively. This arrangement of the optical member 6 allows the thickness of the optical member 6 through which the reading axis R is penetrated to increase, thereby increasing the total focal length of the imaging unit 4. The increase of the total focal length allows the reading distance to increase (see the reading distance L1 in FIG. 2A), which is suitable for the long distance La relatively far from the reading window 1a.

In contrast, when the distance L between each pointer light emitting device 15a, 15b and the label P is relatively "short", the optical member 6 is rotated up to the third rotation stop position to be stopped thereat.

As shown in FIG. 2C, when the optical member 6 is located at the third rotation stop position, the concaved surfaces 6c1, 6c1 of the optical member 6 are arranged to be orthogonal to the reading axis R, respectively. This arrangement of the optical member 6 allows the thickness of the optical member 6 through which the reading axis R is penetrated to decrease, thereby reducing the total focal length of the imaging unit 4. The reduction of the total focal length allows the reading distance to decrease (see the reading distance L3 in FIG. 2C), which is suitable for the short distance Lc relatively close to the reading window 1a.

On the other hand, when the distance L between each pointer light emitting device 15a, 15b and the label P is relatively "medium", the optical member 6 is rotated up to the second rotation stop position to be stopped thereat.

As shown in FIG. 2B, when the optical member 6 is located at the second rotation stop position, the second side surfaces 6b, 6b of the optical member 6 are arranged to be orthogonal to the reading axis R, respectively. This arrangement of the optical member 6 allows the thickness of the optical member 6 through which the reading axis R is penetrated to be kept medium between the thickness of the optical member 6 at the first rotation stop position and that of the optical member 6 at the third rotation stop position. This permits the reading distance to be kept medium (see the reading distance L2 in FIG. 2B) between the reading distances L1 and L3, which is suitable for the medium distance Lb.

Consequently, even if the label P is positioned at any one of the long distance La, the medium distance Lb, and the short distance Lc, one of the reading directions L1 to L3, which is suitable for any one of the long distance La, the medium distance Lb, and the short distance Lc, can be automatically determined.

As a result, it is possible to widen the range of usable reading distances of the two-dimensional code reader CR.

In the embodiment, the rotation of the optical member 6 and the selective setting of one of the first to third rotation stop positions of the optical member 6 permit the plurality of total focal lengths of the imaging unit 4 to be set. This allows the structure of the mechanism for adjusting the total focal length of the imaging unit to be simplified, as compared with a case of using the focusing disk set forth above having the plurality of optical parts corresponding to the plurality of reading distances.

Moreover, it is possible to reduce the number of components constituting the mechanism for adjusting the total focal length of the imaging unit, as compared with a case of using the focusing disk having the plurality of optical parts corresponding to the plurality of reading distances. These effects also allow the size of the adjusting unit to be compact.

In addition, the mechanism for adjusting the total focal length of the imaging unit 4 drives the stepping motor 10 only when changing the total focal length of the imaging unit 4 without keeping a drive current flowing in the stepping motor 10. This allows electric power consumption of the adjusting mechanism to decrease, thereby making the adjusting mechanism suitable for battery-type handheld optical information readers.

In particular, in the embodiment, the optical member 6 interposed between the imaging lens 3 and the photodetector 2 allows the whole size of the imaging unit 4 to be kept compact, as compared with a case where the optical member is disposed to the reading window side in the body case 1.

The optical member 6 has the first side surfaces 6a, 6a parallel to each other and symmetrical through the rotation axis O, the second side surfaces 6b, 6b parallel to each other and symmetrical through the rotation axis O, and the third side surfaces 6c, 6c parallel to each other and symmetrical through the rotation axis O.

The optical member 6 is configured that, when the optical member 6 is located at one of the first to third rotation stop positions, any one paired parallel side surfaces, which correspond to one of the first to third rotation stop positions, are orthogonal to the reading axis R, respectively.

That is, the optical member 6 having a relatively simple shape, such as a substantially hexagonal cylinder, can adjust the optical path length between the photodetector 2 and the imaging lens 3. In addition, one of each pair of side surfaces and the other thereof are symmetrically positioned and formed through the rotation axis O. This structure allows the dynamic balance of the optical member 6 to be stable.

Furthermore, the embodiment includes the unit for measuring a positional relationship between the label P and the reading window 1a, and the drive unit 9 is adapted to rotate the optical member 6 among the predetermined first to third rotation stop positions according to the measurement result under the control of the control circuit CC. This structure permits the optical member 6 to automatically rotate, thereby making it convenient for the user to perform the reading operations.

As the unit for measuring the positional relationship between the label P and the reading window 1a, the pair of pointer light emitting devices 15a, 15b each having a relatively simple structure are provided This makes it possible to keep the size of the two-dimensional code reader CR compact.

Figure 7A:
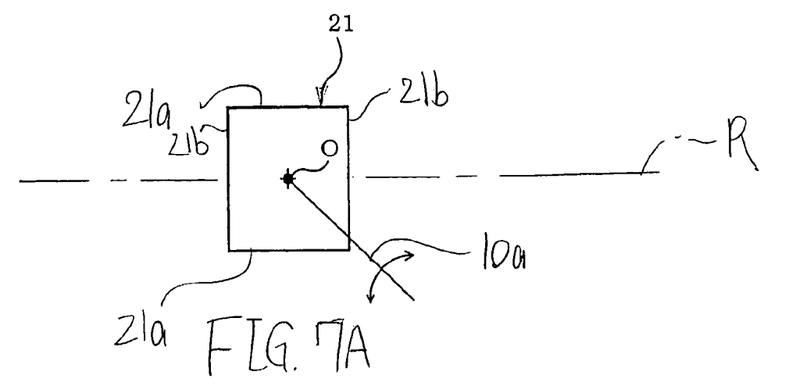
FIG. 7A is a view illustrating a modification of the optical member according to the embodiment.

As a modification of the embodiment, an optical member 21 shown in FIG. 7A is formed by transparent material with high refractive index, which is similar to the above embodiment. The optical member 21 has a substantially rectangular parallelepiped shape and has a first pair of lateral side surfaces 21a, 21a, which are opposite and parallel to each other across the rotation axis O. The optical member 21 has second pair of longitudinal side surfaces 21b, 21b, which are opposite and parallel to each other across the rotation axis O As well as the first embodiment, when the optical member 21 is rotated together with the rotation shaft 10a by an angle of 90 degrees, the optical member 21 is configured to be temporally fixed at a predetermined first stop position so that the longitudinal side surfaces 21b, 21b are orthogonal to the reading axis R. In addition, when the optical member 21 is further rotated together with the rotation shaft 10a by an angle of 90 degrees, the optical member 21 is configured to be temporally fixed at a predetermined second stop position so that the lateral side surfaces 21a, 21a are orthogonal to the reading axis R.

A first thickness of the optical member 21 located at the first stop position, through which the reading axis R is penetrated, is different from a second thickness of the optical member 21 located at the second stop position, through which the reading axis R is penetrated.

This allows the total focal length of the imaging unit to be changed between a first total focus length based on the first thickness and a second total focus length based on the second thickness. Other structures and operations are identical with the structure and operations of the embodiment.

Figure 7B:
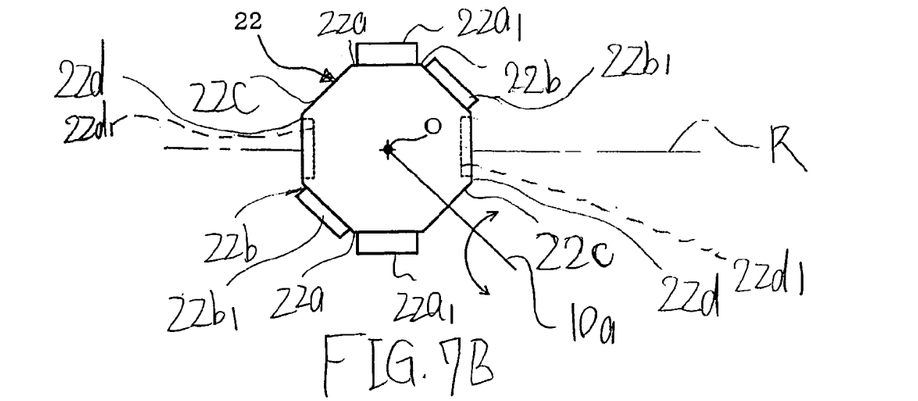
FIG. 7B is a view illustrating another modification of the optical member according to the embodiment.

As another modification of the embodiment, an optical member 22 shown in FIG. 7B is formed by transparent material with high refractive index, which is similar to the above embodiment. The optical member 22 has a substantially octagonal cylinder and has four pairs of opposite side surfaces parallel to each other.

The optical member 22 has four pairs of side surfaces, the first pair of which is first side surfaces 22a, 22a, the second pair of which is second side surfaces 22b, 22b, the third pair of which is third side surfaces 22c, 22c, and the fourth pair of which is fourth side surfaces 22d, 22d.

The first side surfaces 22a, 22a are parallel and opposite to each other across the rotation axis O, and the second side surfaces 22b, 22b are parallel and opposite to each other across the rotation axis O. The third side surfaces 22c, 22c are parallel and opposite to each other across the rotation axis O, and the fourth side surfaces 22d, 22d are parallel and opposite to each other across the rotation axis O.

When the optical member 22 is configured to be temporally fixed at a predetermined first stop position so that the first side surfaces 22a, 22a are orthogonal to the reading axis R. In addition, when the optical member 22 is rotated together with the rotation shaft 10a, the optical member 22 is configured to be temporally fixed at a predetermined second stop position so that the second side surfaces 22b, 22b are orthogonal to the reading axis R.

When the optical member 22 is configured to be temporally fixed at a predetermined third stop position so that the third side surfaces 22c, 22c are orthogonal to the reading axis R. In addition, when the optical member 22 is rotated together with the rotation shaft 10a, the optical member 22 is configured to be temporally fixed at a predetermined fourth stop position so that the fourth side surfaces 22d, 22d are orthogonal to the reading axis R.

A first thickness of the optical member 22 located at the first stop position, through which the reading axis R is penetrated, and a second thickness of the optical member 22 located at the second stop position, through which the reading axis R is penetrated, are different from each other. The second thickness of the optical member 22 and a third thickness of the optical member 22 located at the third stop position, through which the reading axis R is penetrated, are different from each other. The third thickness of the optical member 22 and a fourth thickness of the optical member 22 located at the fourth stop position, through which the reading axis R is penetrated, are different from each other.

This allows the total focal length of the imaging unit to be changed among first to fourth total focus lengths based on the first to fourth thicknesses, respectively. Other structures and operations are identical with the structure and operations of the embodiment.

Figure 7C:
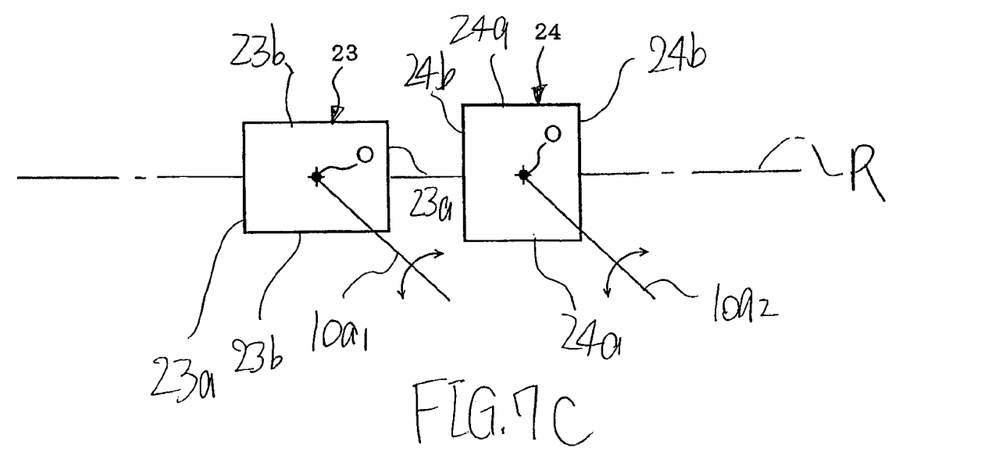
FIG. 7C is a view illustrating a further modification of the optical member according to the embodiment.

As a further modification of the embodiment, first and second optical members 23 shown in FIG. 7C are formed by transparent material with high refractive index, which is similar to the above embodiment.

The first optical member 23 has a substantially rectangular parallelepiped shape and has first pair of lateral side surfaces 23a, 23a, which are opposite and parallel to each other across the rotation axis O. The first optical member 23 has second pair of longitudinal side surfaces 23b, 23b, which are opposite and parallel to each other across the rotation axis O.

The second optical member 24 has a substantially rectangular parallelepiped shape and has first pair of lateral side surfaces 24a, 24a, which are opposite and parallel to each other across the rotation axis O. The first optical member 24 has second pair of longitudinal side surfaces 24b, 24b, which are opposite and parallel to each other across the rotation axis O.

As well as the first embodiment, when each of the first and second optical members 23 and 24 is rotated together with each of the rotation shafts 10a1 and 10a2 by an angle of 90 degrees, each of the first and second optical members 23 and 24 is configured to be temporally fixed at a predetermined first stop position, so that the longitudinal side surfaces 23b, 23b, and 24b, 24b are orthogonal to the reading axis R.

In addition, when each of the first and second optical members 23 and 24 is rotated together with each of the rotation shafts 10a1 and 10a2 by an angle of 90 degrees, each of the first and second optical members 23 and 24 is configured to be temporally fixed at a predetermined second stop position so that the lateral side surfaces 23a, 23a and 24a, 24a are orthogonal to the reading axis R.

A first focal length includes thicknesses of the first and second optical members 23 and 24 located at the first stop positions, respectively. A second focal length includes a thickness of the first optical member 23 located at the second stop position and that of the second optical member 24 at the first stop position. A third focal length includes a thickness of the first optical member 23 located at the first stop position and that of the second optical member 24 at the second stop position, and a fourth focal length includes thicknesses of the first and second optical members 23 and 24 located at the second stop positions, respectively.

In this further modification, it is possible to switchably set one of the first to fourth focal lengths of the imaging unit.

In the embodiment and modifications, the unit for measuring a positional relationship between the label P and the reading window 1a is provided so that the drive unit 9 is adapted to automatically rotate the optical member 6 among the predetermined first to third rotation stop positions according to the measurement result. However, the present invention is not limited to the structure.

The user may manually operate the optical member 6 to rotate it, thereby adjusting the total focal length of the imaging unit. In this case, the unit for measuring the positional relationship between the label P and the reading window 1a is not necessarily provided for the two-dimensional code reader CR so that the user may determine the positions of the optical member 6 by eye. The measurement result obtained by the measuring unit may be displayed on, for example, the display. The structure of the measuring unit and that of the drive unit may be variably modified.

The present invention is not limited to the structure of the embodiment. That is, the optical member may be disposed between the imaging lens and the reading window. The optical information reader according to the present invention is not apply only to read the two-dimensional code. The optical information reader according to the present invention may be applicable for reading a barcode or other information While there has been described what is at present considered to be these embodiment and modifications of the invention, it will be understood that various modifications which are not described yet may be made therein, and it is intended to cover in the appended claims all such modifications as fall within the true spirit and scope of the invention.

What is claimed is:

1. An optical information reader for optically reading a target based on a light reflected from the target, said optical information reader comprising:

an imaging lens with an optical axis and a focal length, said reflected light entering into the imaging lens;

a photodetector having an active area and located on the optical axis, said imaging lens focusing the reflected light on the active area of the photodetector based on the focal length; and a translucent optical member located on the optical axis and rotatable around a rotation axis substantially orthogonal to the optical axis, said translucent optical member being fixable at least first and second predetermined positions, wherein, when the translucent optical member is fixed at the first predetermined position, the translucent optical member has a first thickness through which the optical axis is penetrated, and when the translucent optical member is temporally fixed at the second predetermined position, the translucent optical member has a second thickness through which the optical axis is penetrated, and wherein said first thickness and second thickness are different from each other.

2. An optical information reader according to claim 1, wherein said translucent optical member has at least first and second pairs of surfaces, the surfaces of the first pair are opposite and parallel to each other across the rotation axis, and the surfaces of second pair are opposite and parallel to each other across the rotation axis.

3. An optical information reader according to claim 2, wherein, when the translucent optical member is temporally fixed at one of the first and second predetermined positions, the surfaces of one of the first and the second pairs are orthogonal to the optical axis.

4. An optical information reader according to claim 2, wherein the surfaces of the first pair are symmetrically positioned and formed across the rotation axis, and the surfaces of the second pair are symmetrically positioned and formed across the rotation axis.

5. An optical information reader according to claim 2, further comprising:

a body case containing the imaging lens, the photodetector, and the translucent optical member therein, said body case having a reading window through which the reflected light enters in the body case, said reading window being located on the optical axis to be opposite to the imaging lens; and a unit for measuring a positional relationship between the reading window and the target.

6. An optical information reader according to claim 5, further comprising a drive unit rotatably and fixably supporting the translucent optical member and configured to drive the translucent optical member to rotate it up to one of the first and second predetermined positions according to the measured positional relationship between the reading window and the target.

7. An optical information reader according to claim 6, wherein said first thickness is longer than the second thickness, said drive unit drives the translucent optical member to rotate the translucent optical member up to the first predetermined position according to the measured positional relationship between the reading window and the target, said measured positional relationship representing that the target is far from the reading window, and said drive unit drives the translucent optical member to rotate the translucent optical member up to the second predetermined position according to the measured positional relationship between the reading window and the target, said measured positional relationship representing that the target is close to the reading window.

8. An optical information reader according to claim 2, wherein the surfaces of the first pair at least partially protrude outwardly so that the at least partially protruded surfaces are parallel to the rotation axis, respectively, said optical axis being penetrated through the partially protruded surfaces when the translucent optical member is fixed at the first predetermined position, and wherein the surfaces of the second pair at least partially concave inwardly so that the at least partially concaved surfaces are parallel to the rotation axis, respectively, said optical axis being penetrated through the partially concaved surfaces when the translucent optical member is fixed at the second predetermined position.

9. An optical information reader according to claim 1, wherein said translucent optical member is interposed between the imaging lens and the photodetector.

10. A method of optically reading a target based on a light reflected from the target, said method comprising:

providing an imaging lens with an optical axis and a focal length;

providing a photodetector having an active area to be located on the optical axis;

providing a translucent optical member having first and second different thicknesses to be located on the optical axis;

rotating the translucent optical member around a rotation axis substantially orthogonal to the optical axis;

fixing the translucent optical member to one of first and second predetermined positions so that the optical axis is penetrated through the one of the first and second different thicknesses, thereby adjusting the focal length; and when the reflected light enters into the imaging lens, focusing the reflected light on the active area of the photodetector through the imaging lens based on the adjusted focal length.

* * * * *